(12) United States Patent
Ejiri et al.

(10) Patent No.: US 6,613,810 B1
(45) Date of Patent: Sep. 2, 2003

(54) EXPANDABLE MICROSPHERES AND PROCESS FOR PRODUCING THE SAME

(75) Inventors: Tetsuo Ejiri, Fukushima (JP); Genzo Asai, Fukushima (JP); Yoshikatsu Satake, Fukushima (JP)

(73) Assignee: Kureha Kagaku K.K., Tokyo (JP)

( * ) Notice: Subject to any disclaimer, the term of this patent is extended or adjusted under 35 U.S.C. 154(b) by 0 days.

(21) Appl. No.: 09/600,986

(22) PCT Filed: Jan. 22, 1999

(86) PCT No.: PCT/JP99/00239

§ 371 (c)(1),
(2), (4) Date: Jul. 25, 2000

(87) PCT Pub. No.: WO99/37706

PCT Pub. Date: Jul. 29, 1999

(30) Foreign Application Priority Data

Jan. 26, 1998 (JP) .......................................... 10-027801
Dec. 28, 1998 (JP) .......................................... 10-373407

(51) Int. Cl.[7] .............................. C08J 9/24; B01J 13/02

(52) U.S. Cl. .......................................... 521/56; 521/60

(58) Field of Search ..................................... 521/56, 60

(56) References Cited

U.S. PATENT DOCUMENTS

| 3,615,972 A | 10/1971 | Morehouse et al. ........ 521/146 |
| 4,085,267 A | 4/1978 | Morningstar et al. |
| 5,155,138 A | 10/1992 | Lundqvist |
| 5,753,156 A | 5/1998 | Shigemori et al. |

FOREIGN PATENT DOCUMENTS

| EP | 0-566367 | 4/1993 |
| EP | 0 684 261 | 11/1995 |
| JP | 42-26524 | 12/1942 |
| JP | 56-143229 | 11/1981 |
| JP | 60-19033 | 1/1985 |
| JP | 62-205108 | 9/1987 |
| JP | 62-286534 | 12/1987 |
| JP | 2-284905 | 11/1990 |
| JP | 4-292643 | 10/1992 |
| JP | 5-329360 | 12/1993 |
| JP | 6-49260 | 2/1994 |
| JP | 7-196813 | 8/1995 |
| JP | 2-584376 | 11/1996 |
| JP | 9-19635 | 1/1997 |

Primary Examiner—Morton Foelak
(74) Attorney, Agent, or Firm—Dinsmore & Shohl LLP (57) ABSTRACT

Foamable microspheres with a foaming agent enclosed in the shell of a polymer, wherein the average particle diameter of the microspheres is within a range of 3 to 100 $\mu$m, and the coefficient of variation of the particle diameter distribution thereof is at most 1.50%, and production process of foamable microspheres by a suspension polymerization process.

25 Claims, 2 Drawing Sheets

EXPANDABLE MICROSPHERES AND
PROCESS FOR PRODUCING THE SAME

TECHNICAL FIELD

The present invention relates to foarmable microspheres with a foaming agent enclosed in the shell of a polymer, and more particularly to foamable microspheres extremely sharp in particle diameter distribution. The present invention also relates to a process for producing foamable microspheres extremely sharp in particle diameter distribution by a suspension polymerization process. The present invention further relates to a process for producing foamable microspheres, by which aggregation of polymer particles formed and adhesion of scale to the wall of a polymerization vessel upon polymerization are prevented, and foamable microspheres even in particle shape in the form of a sphere and capable of sharply foaming to provide uniform foams can be provided. The foamable microspheres according to the present invention can be utilized in a wide variety of technical fields including fields of paint and ink.

BACKGROUND ART

In recent years, foamable microspheres have been developed into uses in various fields such as fillers for paints and plastics for the purpose of lightening weight. including the use of foaming ink. The foamable microspheres are generally obtained by microcapsulating a volatile, liquid foaming agent (also referred to as a physical foaming agent or volatile expanding agent) by a thermoplastic resin. Such foamable microspheres have heretofore been produced by a process in which a polymerizable mixture containing at least a foaming agent and a polymerizable monomer is subjected to suspension polymerization in an aqueous dispersion medium. With the progress of the polymerization reaction, a shell is formed by a polymer formed, thereby obtaining the foamable microspheres containing the foaming agent encapsulated in the shell.

In the suspension polymerization process, the polymerizable mixture is generally added to the aqueous dispersion medium containing a dispersion stabilizer, the aqueous dispersion medium containing such a mixture is stirred and mixed to form fine droplets of the polymerizable mixture, and the resultant dispersion is then heated to conduct suspension polymerization. Since the polymerizable mixture forms an oil phase in the aqueous dispersion medium, it can be formed into fine droplets by stirring and mixing. By the suspension polymerization, foamable microspheres having substantially the same particle diameter as these fine droplets are formed. In the step of forming the fine particles of the polymerizable mixture, the stirring and mixing have heretofore been conducted by means of a general agitating blade or a batch-wise high-speed, high-shear type dispersing machine. In the suspension polymerization process, foamable microspheres, the particle shape of which is made even in the form of a sphere, can be provided by suitably selecting a dispersion stabilizer, a polymerization aid and the like. Accordingly, foamable microspheres having properties satisfactory to some extent can be obtained by devising suspension polymerization conditions even when such stirring and mixing method as described above is adopted.

However, when application fields of foamable microspheres are enlarged, and higher performance comes to be required in each application field, the level required of the foamable microspheres is also raised. As the performance of the foamable microspheres, it is particularly important that foaming is sharp, and foams uniform in shape and size can be formed. The phrase "forming is sharp" as used herein means that foam initiating temperatures of individual particles of the foamable microspheres are substantially the same, and the particles initiate foaming all at once under foaming temperature conditions. Therefore, the foamable microspheres are required to have an extremely narrow particle diameter distribution in addition to the even particle shape in the form of a sphere. However, the foamable microspheres obtained in accordance with the conventional process is not sufficiently sharp in particle diameter distribution and hence contain minute particles and coarse particles in plenty based on an average particle diameter. When the particle diameter distribution of the foamable microspheres is broad as described above, foaming conditions among individual particles are delicately different, and so foaming cannot be sharply conducted. In addition, when the particle diameter distribution is broad, foams of uniform size cannot be obtained. Such a tendency is particularly marked when the average particle diameter of the foamable microspheres is great. On the other hand, when classification is conducted to narrow the particle diameter distribution of the foamable microspheres, the process becomes complicated, and a yield is lowered.

The above-described problems are described by specific examples. For example, the use of foamable microspheres broad in particle diameter distribution as a weight-lightening agent or functionality-imparting agent for high-performance paints arises a problem that a finished surface becomes rough due to the presence of coarse particles. The coarse particles are easy to foam at a low temperature to impair sharp foaming. The coarse particles also involves that an expansion ratio cannot be raised because the foaming agent is easy to escape. The minute particles involves a problem that an expansion ratio cannot be raised because the content of the foaming agent therein is low. Such problems become a fatal defect in use of the foamable microspheres for an extremely thin coating film capable of making the best use of the feature thereof.

The foamable microspheres not only are incorporated into ink, paint, plastics and the like in an unformed state, but also may be used in a foamed state according to their uses. More specifically, foams (hollow plastic balloons) of the foamable microspheres are very light-weight and hence come to be used as a filler for paints, for example, for the purpose of lightening the weight of an object to be coated, such as an automobile. Since the foams are very light fine particles generally having a bulk density of about 0.02 to 0.03 g/cm$^3$ and an average particle diameter of about 20 to 200 $\mu$m, they are easy to escape out in the air when they are taken out of a container and incorporated into a base material for a paint or the like. In addition, the foams gather on the top of the base material upon their stirring and mixing with the base material, and so it is very difficult to uniformly mix them.

Therefore, Japanese Patent Application Laid-Open No. 196813/1995 has proposed a production process of non-scattering foamed microspheres (non-scattering hollow plastic balloons) in which unformed foamable microspheres are mixed with a plasticizer at a temperature lower than the foam initiating temperature of the foamable microspheres, the resultant mixture is brought into contact with another plasticizer heated to a temperature higher than the foam initiating temperature of the foamable microspheres to foam the formable microspheres, and the foamed microspheres are cooled to prevent overfoaming. According to this process, there are merits that ① the unformed foamable microspheres can be dispersed in the plasticizer to make them a fluid state permitting quantitative feeding by a pump, ② uniform non-scattering foamed microspheres can be obtained at the same time as the foaming of the foamable microspheres, and ③ the amount of the plasticizer used can be very lessened compared with a process of simply wetting with a plasticizer. In order to adopt such a process, the foamable microspheres are required to have the following properties:

(1) having good solvent resistance because a plasticizer is used as a wetting agent;
(2) exhibiting a viscosity as low as possible when the foamable microspheres are dispersed in the plasticizer in order that the microspheres can be quantitatively fed by a pump;
(3) causing sharp foaming from the viewpoints of process and product quality; and
(4) forming no aggregate upon a foaming process.

Accordingly, there is a demand for development of foamable microspheres having these properties (1) to (4) in combination. However, the conventional foamable microspheres are broad in particle diameter distribution and hence cannot fully satisfy these required properties.

On the other hand, a production process of foamable microspheres by the suspension polymerization process tends to cause problems that polymer particles formed aggregate and scale adheres to the wall of a polymerization vessel upon polymerization. Therefore, various processes for producing foamable microspheres by devising a polymerization aid and a dispersion stabilizer have heretofore been proposed. However, the conventional production processes have involved various problems and been not fully satisfactory.

For example, Japanese Patent Publication No. 26524/1967 describes unicellular particles (i.e., foamable microspheres) of a thermoplastic resinous polymer with a volatile liquid foaming agent, which becomes a gaseous state at a temperature lower than the softening point of the polymer, enclosed therein. This publication discloses a process for producing spherical particles with the foaming agent enclosed in a shell formed of the thermoplastic resin by adding the foaming agent such as a low-boiling aliphatic hydrocarbon to a monomer, mixing an oil-soluble catalyst with the resultant monomer mixture and then adding the monomer mixture to an aqueous dispersion medium containing a dispersing agent with stirring to conduct suspension polymerization. Japanese Patent Application Laid-Open No. 286534/1987 describes a process for producing heat-expanding microcapsules (i.e., foamable microspheres) by using a polymer obtained from a component comprising at least 80 wt. % of a nitrile monomer, at most 20 wt. % of a non-nitrile monomer and a crosslinking agent to enmicrocapsulating a volatile expanding agent. In these conventional production processes, a polymerizable mixture comprising a foaming agent, a polymerizable monomer and a polymerization initiator is subjected to suspension polymerization in an aqueous dispersion medium containing colloidal silica as a dispersion stabilizer (suspending agent), a diethanolamine-adipic acid condensation product as an auxiliary stabilizer and potassium bichromate as a polymerization aid, thereby producing the foamable microspheres.

However, potassium bichromate used as the polymerization aid in these conventional processes involves a problem that it has toxicity. In addition, when potassium bichromate is used, the resulting foamable microspheres are colored yellow due to a remaining chromium ion, thereby impairing the color tone of various products comprising such microspheres in an unformed or foamed state. When such yellow microspheres are caused to be contained in a colored product in particular, the color tone of the product tends to become dull.

When potassium bichromate is not used upon the suspension polymerization, polymer particles formed show a tendency to aggregate, or a problem that a polymer formed adheres as scale to the wall of a polymerization vessel is easy to arise. When the polymer particles aggregate, the viscosity of the suspension polymerization reaction system is increased to adversely affect the progress of the polymerization reaction and the particle shape of the resulting foamable microspheres. When polymer scale covers the wall of the polymerization vessel, the heat removing ability of the polymerization vessel is lowered, and a yield of the foamable microspheres is reduced. When aggregates of the polymer particles or peeled matter from polymer scale adhered are mixed in the foamable microspheres, a problem that a finished surface becomes rough arises when such foamable microspheres are used as, for example, a weight-lightening agent or functionality-imparting agent for high-performance paints, since these aggregates and peeled matter from polymer scale are coarse particles. These coarse particles and particles in a form out of sphere cause problems that they are easy to foam at a low temperature compared with spherical particles, and that the foaming agent is easy to escape, and so an expansion ratio cannot be raised. Such problems become a fatal defect in use of the foamable microspheres for, in particular, an extremely thin coating film capable of making the best use of the feature thereof. In the case of their use for air spray, the clogging of a gun and uneven coating tend to occur.

Japanese Patent Application Laid-Open No. 292643/1992 (Patent No. 2584376) discloses a process for producing foamable thermoplastic microspheres by using, as a suspending agent (dispersion stabilizer), a powdered stabilizer insoluble in an aqueous medium at a pH that the aqueous medium has upon polymerization, such as magnesium hydroxide. This publication states that "According to this process, the powdered stabilizer can be dissolved and removed by lowering the pH of the aqueous medium after the polymerization, so that foamable microspheres having a clean polymer surface can be provided." However, the problem that polymer particles aggregate cannot be solved even by this process.

DISCLOSURE OF THE INVENTION

It is an object of the present invention to provide foamable microspheres which have a spherical particle shape, are extremely sharp in particle diameter distribution and are capable of sharply foaming to provide uniform foams.

Another object of the present invention is to provide a process for producing such foamable microspheres sharp in particle diameter distribution.

A further object of the present invention is to provide a process for producing foamable microspheres, by which aggregation of polymer particles formed and adhesion of scale to the wall of a polymerization vessel upon polymerization are prevented, and foamable microspheres even in particle shape in the form of a sphere and capable of sharply foaming to provide uniform foams can be provided.

The present inventors have carried out an extensive investigation with a view toward overcoming the above-described problems involved in the prior art. As a result, it has been found that in a process for producing foamable microspheres with a foaming agent enclosed in the shell of a polymer formed by subjecting a polymerizable mixture containing at least the foaming agent and a polymerizable monomer to suspension polymerization in an aqueous dispersion medium, the aqueous dispersion medium and the polymerizable mixture are fed to a continuous high-speed, high-shear type stirring and dispersing machine, continuously stirring both in the stirring and dispersing machine so as to disperse the polymerizable mixture in the aqueous dispersion medium, and the resultant dispersion is then poured into a polymerization tank to conduct suspension polymerization in the polymerization tank, whereby foamable microspheres having an average particle diameter within a range of 3 to 100 μm and an extremely sharp particle diameter distribution of at most 1.50% in terms of the coefficient of variation of the particle diameter distribution are provided. The foamable microspheres are novel and can sharply foam due to their low contents of coarse particles and minute particles to provide uniform foams.

As a result of the extensive investigation, the present inventors have also found that in a process for producing foamable microspheres with a foaming agent enclosed in the shell of a polymer formed by subjecting a polymerizable mixture containing at least the foaming agent and a polymerizable monomer to suspension polymerization in an aqueous dispersion medium, the suspension polymerization of the polymerizable mixture is conducted in the presence of at least one compound selected form the group consisting of alkali metal nitrites, stannous chloride, stannic chloride, water-soluble ascorbic acids and boric acid, whereby foamable microspheres can be produced stably without causing aggregation of polymer particles formed upon the polymerization while preventing the polymer formed from adhering to the wall of a polymerization vessel and efficiently removing heat generated by the polymerization. The foamable microspheres obtained according to this production process can sharply foam to provide uniform foams due to their low contents of aspherical particles and aggregated particles.

The present invention has been led to completion on the basis of these findings.

According to the present invention, there are thus provided foamable microspheres with a foaming agent enclosed in the shell of a polymer, wherein the average particle diameter of the microspheres is within a range of 3 to 100 μm, and the coefficient of variation of the particle diameter distribution thereof is at most 1.50%.

According to the present invention, there is also provided a process for producing foamable microspheres with a foaming agent enclosed in the shell of a polymer formed by subjecting a polymerizable mixture containing at least the foaming agent and a polymerizable monomer to suspension polymerization in an aqueous dispersion medium, the process comprising feeding the aqueous dispersion medium and the polymerizable mixture into a continuous high-speed, high-shear type stirring and dispersing machine, continuously stirring both in the stirring and dispersing machine so as to disperse the polymerizable mixture in the aqueous dispersion medium, and then pouring the resultant dispersion into a polymerization tank to conduct suspension polymerization in the polymerization tank.

In the step of feeding the aqueous dispersion medium and the polymerizable mixture into the continuous high-speed, high-shear type stirring and dispersing machine, the aqueous dispersion medium and the polymerizable mixture may preferably be continuously fed as separate streams at a fixed ratio into the continuous high-speed, high-shear type stirring and dispersing machine. As another method, may be mentioned a method in which the aqueous dispersion medium and the polymerizable mixture are poured into a dispersing tank, both are stirred in the dispersing tank to primarily disperse the polymerizable mixture in the aqueous dispersion medium, and the resultant primary dispersion is then fed into the continuous high-speed, high-shear type stirring and dispersing machine.

According to the present invention, there is further provided a process for producing foamable microspheres with a foaming agent enclosed in the shell of a polymer formed by subjecting a polymerizable mixture containing at least the foaming agent and a polymerizable monomer to suspension polymerization in an aqueous dispersion medium, the process comprising conducting the suspension polymerization of the polymerizable mixture in the presence of at least one compound selected from the group consisting of alkali metal nitrites, stanous chloride, stannic chloride, water-soluble ascorbic acids and boric acid.

BEST MODE FOR CARRYING OUT THE INVENTION

Foamable Microspheres

In the foamable microspheres according to the present invention, the average particle diameter thereof is within a range of 3 to 100 μm, and the coefficient of variation of the particle diameter distribution thereof is at most 1.50%. The average particle diameter of the foamable microspheres according to the present invention, and the average particle diameter of foams thereof may be both varied within wide ranges, and can be suitably designed according to uses thereof. The average particle diameter of the foamable microspheres according to the present invention is preferably within a range of 5 to 50 μm in an unformed state. The coefficient of variation of the particle diameter distribution of the foamable microspheres according to the present invention is preferably at most 1.30%, more preferably at most 1.10% when sharp foaming behavior to a particularly high degree or good smoothness on the surface of a coating film is required. The lower limit of the coefficient of variation of the particle diameter distribution is about 0.01%, often about 0.03%.

The coefficient of variation as referred to In the present invention is a value calculated out based on the following equations (1) and (2):

$$C_v = \left( \sqrt{\frac{1}{100} \sum_{j=1}^{n} q_j \left( \frac{\log x_j + \log x_{j+1}}{2} \right)^2 - \mu^2} \Big/ \mu \right) \times 100 \quad (1)$$

$$\mu = \frac{1}{100} \sum_{j=1}^{n} q_j \left( \frac{\log x_j + \log x_{j+1}}{2} \right) \quad (2)$$

wherein $\mu$ is an average value, $x_j$ is a particle diameter, and $q_j$ is a frequency distribution.

The content of the foaming agent in the foamable microspheres according to the present invention is generally 5 to 30 wt. %, preferably 10 to 25 wt. %. Examples of the foaming agent include low-boiling organic solvents and compounds decomposed by heating to generate a gas. Among these, the low-boiling organic solvents are preferred. The shell of the polymer making up each of the foamable microspheres according to the present invention can be formed by using at least one of various polymerizable monomers such as acrylic esters, (meth)acrylonitrile, vinylidene chloride, vinyl chloride and styrene. Among others, the shell is preferably formed with a vinylidene chloride copolymer or a (meth)acrylonitrile copolymer in that gas barrier properties, solvent resistance, heat resistance, foamability and the like are balanced with one another at a high level. According to the present invention, foamable microspheres exhibiting various foaming behaviors can be provided by selecting the combination of the polymerizable monomers used, controlling a compositional ratio therebetween, and selecting the kind of the foaming agent.

The foamable microspheres sharp in particle diameter distribution according to the present invention cause sharp foaming. When the foaming state of foamable microspheres is observed through, for example, a microscope equipped with a hot stage while heating them, it is found that the foamable microspheres obtained by the production process according to the present invention foam at a stretch like popcorn to form uniform foams. On the other hand, foamable microspheres obtained by stirring a polymerizable monomer in an aqueous dispersion medium by means of a general agitating blade or a batch-wise high-speed, high-shear type dispersing machine to prepare a dispersion and then subjecting the dispersion to suspension polymerization according to the conventional process become broad in particle diameter distribution compared with the foamable microspheres according to the present invention, and some of their particles initiate foaming at a temperature lower than the prescribed foam initiating temperature by at least 10° C. or at least 30° C. in some cases.

The conventional foamable microspheres obtained by the suspension polymerization is observed greatly reducing their weight due to leak of the foaming agent even at a temperature lower than the foam initiating temperature when their weight loss upon heating is determined by a thermobalance (TGA). Such weight loss takes place due to the leak of the foaming agent from the foamable microspheres before initiation of foaming. Therefore, the prescribed expansion ratio may not be achieved, and in extreme cases, no foaming occurs. When the process described in Japanese Patent Application Laid-Open No. 196813/1995 is applied to such foamable microspheres broad in particle diameter distribution and uneven in foaming, the viscosity of a slurry upon mixing of a mixture of the foamable microspheres and a plasticizer increases, or partial foaming occurs upon preheating. Since foamable microspheres expand to a degree of 60 to 100 times by volume upon foaming, the mixture with the plasticizer loses its flowability even when foaming partially occurs, so that its pumping becomes infeasible.

Production Process of Foamable Microspheres (I)

The first production process according to the present invention is a process for producing foamable microspheres with a foaming agent enclosed in the shell of a polymer formed by subjecting a polymerizable mixture containing at least the foaming agent and a polymerizable monomer to suspension polymerization in an aqueous dispersion medium. In this process, the aqueous dispersion medium and the polymerizable mixture are fed into a continuous high-speed, high-shear type stirring and dispersing machine to continuously stir both in the stirring and dispersing machine so as to disperse the polymerizable mixture in the aqueous dispersion medium, and the resultant dispersion is then poured into a polymerization tank to conduct suspension polymerization in the polymerization tank, thereby producing the foamable microspheres.

Figure 3:
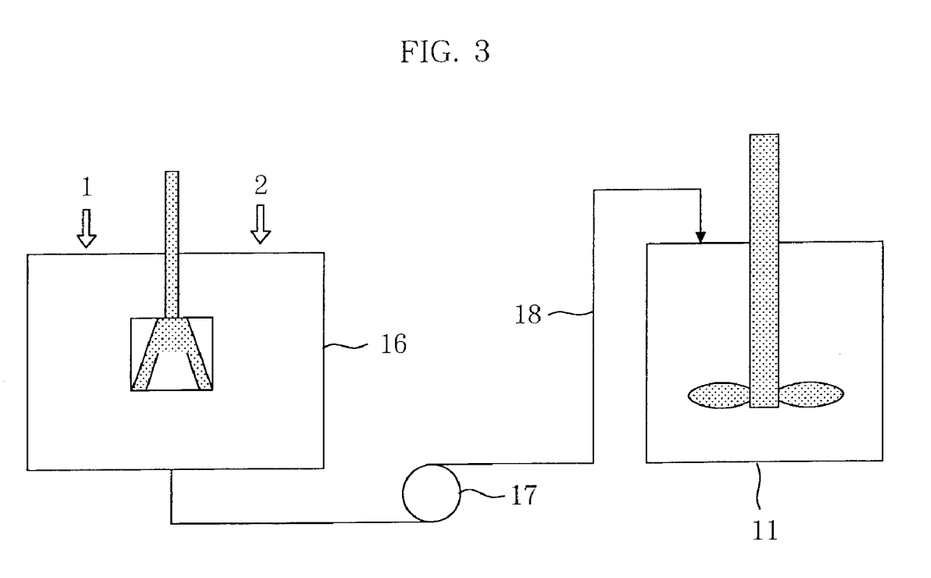
FIG. 3 illustrates an example of the conventional production process using a batch-wise high-speed, high-shear type dispersing machine.

For example, as illustrated in FIG. 3, an aqueous dispersion medium 1 and a polymerizable mixture 2 have heretofore been poured into a batch-wise high-speed, high-shear type dispersing machine 16 and stirred to disperse the polymerizable mixture in the aqueous dispersion medium, thereby forming fine droplets of the polymerizable mixture, and the resultant dispersion has then been poured into a polymerization tank 11 through a line 18 by means of a pump 17, thereby conducting suspension polymerization in the polymerization tank. According to such a conventional process, only foamable microspheres the coefficient of variation of the particle diameter distribution of which exceeds 1.50% or at least 2.00% in many cases can be provided.

Figure 1:
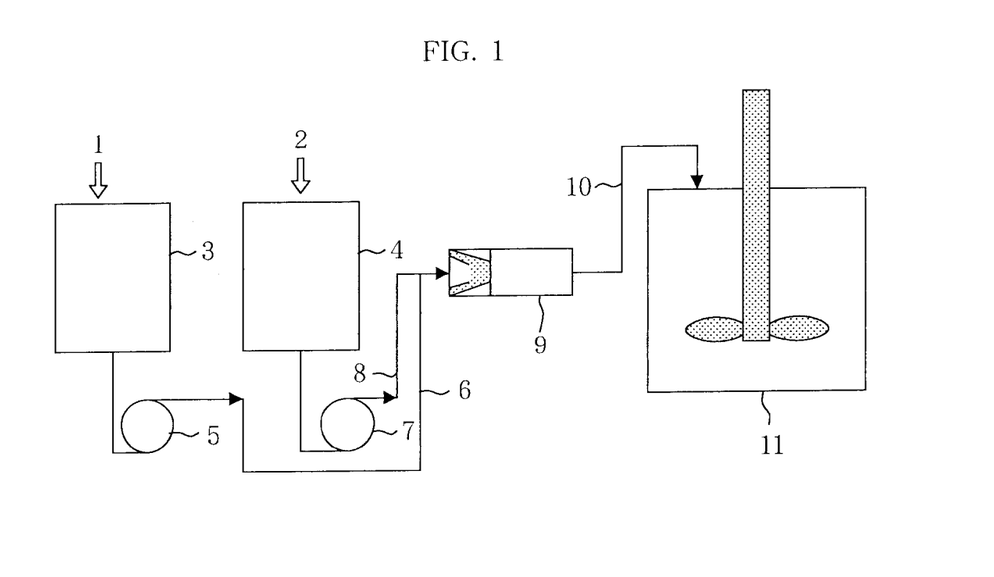
FIG. 1 illustrates an example of the production process according to the present invention using a continuous high-speed, high-shear type stirring and dispersing machine.

On the other hand, according to the production process of the present invention, for example, as illustrated in FIG. 1, in the step of feeding the aqueous dispersion medium and the polymerizable mixture into the continuous high-speed, high-shear type stirring and dispersing machine, the aqueous dispersion medium 1 and the polymerizable mixture 2 are continuously fed as separate streams at a fixed ratio into the continuous high-speed, high-shear type stirring and dispersing machine. More specifically, the aqueous dispersion medium 1 and the polymerizable mixture 2 are stored in a storage tank 3 and a storage tank 4, respectively. The aqueous dispersion medium 1 and the polymerizable mixture 2 are fed as separate streams into the continuous high-speed, high-shear type stirring and dispersing machine 9 through a line 6 by means of a pump 5 and a line 8 by means of a pump 7, respectively. A feeding ratio of the aqueous dispersion medium 1 to the polymerizable mixture 2 is generally within a range of 1:1 to 6:1, preferably 2:1 to 4:1. Both are continuously stirred in the stirring and dispersing machine 9 to disperse the polymerizable mixture in the aqueous dispersion medium, and the resultant dispersion is then poured into a polymerization tank 11 through a line 10 to conduct suspension polymerization in the polymerization tank 11.

Figure 2:
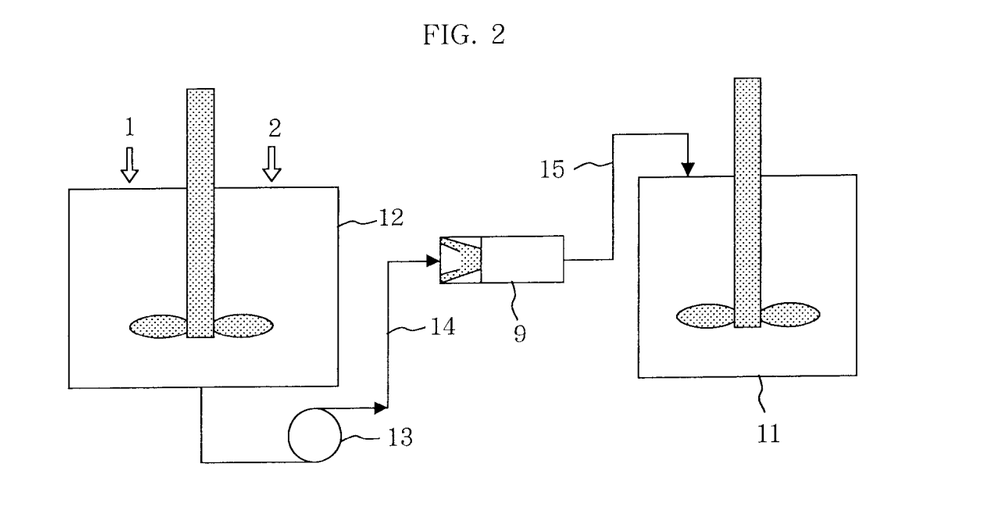
FIG. 2 illustrates another example of the production process according to the present invention using the continuous high-speed, high-shear type stirring and dispersing machine.

According to another embodiment of the production process of the present invention, as illustrated in FIG. 2, in the step of feeding the aqueous dispersion medium and the polymerizable mixture into the continuous high-speed, high-shear type stirring and dispersing machine, the aqueous dispersion medium 1 and the polymerizable mixture 2 are poured into a dispersing tank 12, and both are stirred in the dispersing tank 12 to primarily disperse the polymerizable mixture in the aqueous dispersion medium. The dispersing tank 12 is usually equipped with a general agitating blade. A feeding ratio of the aqueous dispersion medium 1 to the polymerizable mixture 2 is generally within a range of 1:1 to 6:1, preferably 2:1 to 4:1. The resultant primary dispersion obtained by stirring within the dispersing tank is fed into the continuous high-speed, high-shear type stirring and dispersing machine 9 through a line 14 by means of a pump 13. The primary dispersion is further stirring and dispersed in the stirring and dispersing machine 9, and the resultant dispersion is then poured into the polymerization tank 11 through a line 15 to conduct suspension polymerization in the polymerization tank 11.

In the production process according to the present invention, conditions such as the number of revolutions of the continuous high-speed, high-shear type stirring and dispersing machine and the mixing ratio of the aqueous dispersion medium to the polymerizable mixture are preset according to the desired particle diameter of the foamable microspheres. The number of revolutions of the continuous high-speed, high-shear type stirring and dispersing machine is generally selected within a range of 1,400 to 14,000 rpm, preferably 2,000 to 5,000 rpm. It is considered that the size of droplets of the polymerizable mixture is made even by continuously applying high shearing force to the aqueous dispersion medium and the polymerizable mixture by the continuous high-speed, high-shear type stirring and dispersing machine to stir them at a high speed, and the particle diameter distribution thereof is hence narrowed. As a result, foamable microspheres having an extremely sharp particle diameter distribution of at most 1.50%, preferably at most 1.30%, particularly preferably at most 1.10%, in terms of the coefficient of variation of the particle diameter distribution can be provided. The foamable microspheres according to the present invention can solve such inconveniences as described above to exhibit excellent various properties.

In the production processes according to the present invention, no particular limitation is imposed on the foaming agent, polymerizable monomer, other auxiliaries, etc., and those conventionally known may be used. More specifically, the production processes according to the present invention can be applied to the production of foamable microspheres of all types.

(1) Foaming Agent

The foaming agent in the present invention are generally a substance which becomes a gaseous state at a temperature lower than the softening point of the polymer forming the shell. As such a foaming agent, is preferred a low-boiling organic solvent, and examples thereof include low-molecular weight hydrocarbons such as ethane, ethylene, propane, propene, n-butane, isobutane, butene, isobutene, n-pentane, isopentane, neopentane, n-hexane, heptane and petroleum ether; chlorofluorocarbons such as $CCl_3F$, $CCl_2F_2$, $CClF_3$, $CClF_2—CCl_2F_2$; and tetraalkylsilanes such as tetramethyl-silane, trimethylethylsilane, trimethylisopropylsilane and trimethyl-n-propylsilane. These compounds may be used either singly or in any combination thereof. Among these, isobutane, n-butane, n-pentane, isopentane, n-hexane, petroleum ether and mixtures of at least two thereof are preferred. Any compound which is decomposed by heating to become a gaseous state may also be used if desired.

(2) Polymerizable Monomer

Examples of the polymerizable monomer include acrylates such as methyl acrylate, ethyl acrylate, butyl acrylate and dicyclopentenyl acrylate; methacrylates such as methyl methacrylate, ethyl methacrylate, butyl methacrylate and isobornyl methacrylate; and besides acrylonitrile, methacrylonitrile, vinylidene chloride, vinyl chloride, styrene, vinyl acetate, α-methylstyrene, chloroprene, neoprene and butadiene. These polymerizable monomers may be used either singly or in any combination thereof.

In the foamable microspheres, it is preferred that the polymer for forming the shell thereof should be thermoplastic and have gas barrier properties. From these points of view, vinylidene chloride copolymers and (meth)acrylonitrile copolymers are preferred as polymers for forming the shell.

Examples of the vinylidene chloride copolymers include copolymers obtained by using, as polymerizable monomers, 30 to 95 wt. % of vinylidene chloride and 5 to 70 wt. % of a monomer copolymerizable therewith. Examples of the monomer copolymerizable with vinylidene chloride include acrylonitrile, methacrylonitrile, methacrylates, acrylates, styrene and vinyl acetate. More specifically, a monomer mixture containing (a) 30 to 95 wt. % of vinylidene chloride and (b) 5 to 70 wt. % of at least one monomer selected from the group consisting of acrylonitrile, methacrylonitrile, acrylates, methacrylates, styrene and vinyl acetate is preferably used as a polymerizable monomer to produce foamable microspheres. If the copolymerizing proportion of vinylidene chloride is lower than 30 wt. %, the gas barrier properties of the resulting copolymer are deteriorated. If the copolymerizing proportion is higher than 95 wt. %, the foaming temperature range of the resulting foamable microspheres becomes too low. It is hence not preferable to use vinylidene chloride in such a low or high proportion.

As the vinylidene chloride copolymer, is more preferred a terpolymer obtained by using, as a polymerizable monomer, a monomer mixture containing (a) 40 to 80 wt. % of vinylidene chloride, (b1) 19 to 50 wt. % of at least one monomer selected from the group consisting of acrylonitrile and methacrylonitrile, and (b2) 1 to 20 wt. % of at least one monomer selected from the group consisting of acrylates and methacrylates in that a practicable foaming temperature is easily designed, and a high expansion ratio is easy to achieve.

When high solvent resistance and the ability to foam at a high temperature are desired, it is preferred that the shell is formed by a copolymer comprising (meth)acrylonitrile as a main component. More specifically, a monomer mixture containing (c) 51 to 95 wt. % of at least one monomer selected from the group consisting of acrylonitrile and methacrylonitrile and (d) 5 to 49 wt. % of at least one monomer selected from the group consisting of vinylidene chloride, acrylates, methacrylates, styrene and vinyl acetate is preferably used as a polymerizable monomer to produce foamable microspheres. More preferably, the monomer mixture is that containing (c) 51 to 95 wt. % of at least one monomer selected from the group consisting of acrylonitrile and methacrylonitrile, (d1) 1 to 40 wt. % of vinylidene chloride, and (d2) 1 to 48 wt. % of at least one monomer selected from the group consisting of acrylates and methacrylates. If the copolymerizing proportion of (meth) acrylonitrile is lower than 51 wt. %, the solvent resistance and heat resistance of the resulting foamable microspheres are deteriorated. If the copolymerizing proportion is higher than 95 wt. %, the heat-expanding ability of the resulting foamable microspheres is deteriorated. It is hence not preferable to use (meth)acrylonitrile in such a low or high proportion.

As a copolymer containing no vinylidene chloride, is preferred a (meth)acrylonitrile copolymer obtained by using, as a polymerizable monomer, a monomer mixture containing (e) 70 to 95 wt. % of at least one monomer selected from the group consisting of acrylonitrile and methacrylonitrile, and (f) 5 to 30 wt. % of at least one monomer selected from the group consisting of acrylates and methacrylates. More preferably, the monomer mixture is that containing (e1) 55 to 75 wt. % of acrylonitrile, (e2) 20 to 40 wt. % of methacrylonitrile, and (f) 1 to 10 wt. % of at least one monomer selected from the group consisting of acrylates and methacrylates. Foamable microspheres excellent in gas barrier properties, solvent resistance, heat resistance, foamability, etc. can be obtained even from such a (meth) acrylonitrile copolymer.

(3) Crosslinkable Monomer

A crosslinkable monomer may be used in combination with such polymerizable monomers as described above with the view toward improving the foaming properties and heat resistance of the resulting foamable microspheres. As the crosslinkable monomer, is generally used a compound having at least two carbon-carbon double bonds. More specifically, examples of the crosslinkable monomer include divinylbenzene, ethylene glycol di(meth)acrylate, triethylene glycol di(meth)acrylate, allyl methacrylate, triallyl isocyanate, triacrylformal, trimethylolpropane tri(meth) acrylate, 1,3-butylene glycol dimethacrylate and pentaerythritol tri(meth)acrylate. A proportion of the crosslinkable monomer used is generally 0.1 to 1 wt. %, preferably 0.2 to 0.8 wt. % based on the polymerizable monomer.

(4) Polymerization Initiator

No particular limitation is imposed on a polymerization initiator, and those generally used in this field may be used. However, an oil-soluble polymerization initiator soluble in the polymerizable monomer is preferred.

Examples of the polymerization initiator include dialkyl peroxides, diacyl peroxides, peroxy esters, peroxydicarbonates and azo compounds. More specifically, examples thereof include dialkyl peroxides such as methyl ethyl peroxide, di-t-butyl peroxide and dicumyl peroxide; diacyl peroxide such as isobutyl peroxide, benzoyl peroxide, 2,4-dichlorobenzoyl peroxide, and 3,5,5-trimethylhexanoyl peroxide; peroxy esters such as t-butyl peroxypivalate, t-hexyl peroxypivalate, t-butyl peroxyneodecanoate, t-hexyl peroxyneodecanoate, 1-cyclohexyl-1-methylethyl peroxyneodecanoate, 1,1,3,3-tetramethylbutyl peroxyneodecanoate, cumyl peroxyneodecanoate and (α,α-bis-neodecanoylperoxy)diisopropylbenzene; peroxydicarbonates such as bis(4-t-butylcyclohexyl)peroxydicarbonate, di-n-propyl peroxydicarbonate, diisopropyl peroxydicarbonate, di(2-ethylethylperoxy). dicarbonate, dimethoxybutyl peroxydicarbonate and di(3-methyl-3-methoxybutylperoxy)dicarbonate; and azo compounds such as 2,2'-azobisisobutyronitrile, 2,2'-azobis(4-methoxy-2,4-dimethylvaleronitrile), 2,2'-azobis(2,4-dimethylvaleronitrile) and 1,1'-azobis(1-cyclohexanecarbonitrile).

The polymerization initiator is generally contained in the monomer mixture. However, when premature polymerization must be prevented, a part or the whole thereof may be contained in the aqueous dispersion medium to shift it into droplets of the polymerizable mixture during or after the formation of the droplets. The polymerization initiator is generally used in a proportion of 0.0001 to 3 wt. % based on the aqueous dispersion medium.

(5) Aqueous Dispersion Medium

The suspension polymerization is conducted in an aqueous dispersion medium containing a dispersion stabilizer (suspending agent). Examples of the dispersion stabilizer include silica, calcium phosphate, magnesium hydroxide, aluminum hydroxide, ferric hydroxide, barium sulfate, calcium sulfate, sodium sulfate, calcium oxalate, calcium carbonate, barium carbonate and magnesium carbonate. Besides, an auxiliary stabilizer, for example, a condensation product of diethanolamine and an aliphatic dicarboxylic acid, a condensation product of urea and formaldehyde, polyvinyl pyrrolidone, polyethylene oxide, polyethyleneimine, tetramethylammonium hydroxide, gelatin, methyl cellulose, polyvinyl alcohol, dioctyl sulfosuccinate, sorbitan ester, one of various emulsifiers, or the like, may be used. The dispersion stabilizer is generally used in a proportion of 0.1 to 20 parts by weight per 100 parts by weight of the polymerizable monomer.

The aqueous dispersion medium containing the dispersion stabilizer is generally prepared by mixing the dispersion stabilizer and the auxiliary stabilizer into deionized water. The pH of the aqueous phase upon the polymerization is suitably determined according to the kinds of the dispersion stabilizer and auxiliary stabilizer used. For example, when silica such as colloidal silica is used as the dispersion stabilizer, the polymerization is conducted in an acidic environment. In order to acidify the aqueous dispersion medium, an acid is added as needed to adjust the pH of the system to about 3 to 4. When magnesium hydroxide or calcium phosphate is used, the polymerization is conducted in an alkaline environment.

A preferable combination includes a combination of colloidal silica with a condensation product. The condensation product is preferably a condensation product of diethanolamine and an aliphatic dicarboxylic acid, particularly a condensation product of diethanolamine and adipic acid or condensation product of diethanolamine and itaconic acid. The condensation product is defined by an acid number thereof. A condensation product having an acid number not lower than 60, but lower than 95 is preferred, with a condensation product having an acid number not lower than 65, but not higher than 90 being particularly preferred. When an inorganic salt such as sodium chloride or sodium sulfate is further added, foamable microspheres having an evener particle shape are easy to obtain. As the inorganic salt, is preferably used common salt.

Although the amount of colloidal silica used varies according to the particle diameter thereof, it is used in a proportion of generally 1 to 20 parts by weight, preferably 2 to 10 parts by weight per 100 parts by weight of the polymerizable monomer. The condensation product is used in a proportion of generally 0.05 to 2 parts by weight per 100 parts by weight of the polymerizable monomer. The inorganic salt is used in a proportion of about 0 to 100 parts by weight per 100 parts by weight of the polymerizable monomer.

Another preferable combination includes a combination of colloidal silica with a water-soluble nitrogen-containing compound. Examples of the nitrogen-containing compound include polyvinyl pyrrolidone, polyethylene-imine, polyoxyethylene alkylamine, polydialkylaminoalkyl (meth) acrylates typified by polydimethylaminoethyl methacrylate and polydimethylaminoethyl acrylate, polydialkylaminoalkyl(meth)acrylamides typified by polydimethylaminopropylacrylamide and polydimethylaminopropylmethacrylamide, polyacrylamide, cationic polyacrylamide, polyamine sulfone, and polyallylamine. Among these, the combination of colloidal silica with polyvinyl pyrrolidone is preferably used. A further preferable combination includes a combination of magnesium hydroxide and/or calcium phosphate with an emulsifier.

As the dispersion stabilizer, may be used colloid of a hardly water-soluble metal hydroxide (for example, magnesium hydroxide) obtained by the reaction of a water-soluble polyvalent metallic compound (for example, magnesium chloride) with an alkali metal hydroxide (for example, sodium hydroxide) in an aqueous phase. As the calcium phosphate, may be used a reaction product of sodium phosphate with calcium chloride in an aqueous phase. As the emulsifier, may also be used an anionic surfactant, for example, a salt of dialkyl sulfosuccinic acid or a phosphoric ester of polyoxyethylene alkyl (allyl) ether.

At least one compound selected from the group consisting of alkali metal nitrites, stannous chloride, stannic chloride, water-soluble ascorbic acids and boric acid may also be caused to exist as a polymerization aid in the aqueous dispersion medium. When suspension polymerization is conducted in the presence of these compounds, no aggregation of polymer particles formed occurs upon the polymerization, and the polymer formed does not adhere to the wall of a polymerization vessel, so that foamable microspheres can be stably produced while efficiently removing heat generated by the polymerization. These compounds are used in a proportion of generally 0.001 to 1 part by weight, preferably 0.01 to 0.1 parts by weight per 100 parts by weight of the polymerizable monomer. These polymerization aids will be described in detail in "Production process of foamable microspheres (II)" which will be described subsequently.

(6) Suspension Polymerization

Although the order that the respective components are added to the aqueous dispersion medium is optional, water and the dispersion stabilizer, and optionally the auxiliary stabilizer and polymerization aid are generally added to one another to prepare an aqueous dispersion medium containing the dispersion stabilizer.

In the present invention, the polymerizable monomer, polymerization initiator and foaming agent are generally premixed to prepare a polymerizable mixture. As described above, specific methods for dispersing the polymerizable mixture (oily mixture) in the aqueous dispersion medium include ① the method in which the aqueous dispersion medium and the polymerizable mixture are continuously fed as separate streams at a fixed ratio into the continuous high-speed, high-shear type stirring and dispersing machine, and both are continuously stirred in the stirring and dispersing machine to disperse the polymerizable mixture in the aqueous dispersion, and ② the method in which the aqueous dispersion medium and the polymerizable mixture are poured into a dispersing tank, both are stirred in the dispersing tank to primarily disperse the polymerizable mixture in the aqueous dispersion medium, and the resultant primary dispersion is fed into the continuous high-speed, high-shear type stirring and dispersing machine to further continuously stir both in the stirring and dispersing machine, thereby dispersing the polymerizable mixture in the aqueous dispersion. Since the droplet diameter of droplets of the polymerizable mixture varies according to the change of the mixing ratio of the aqueous dispersion medium to the polymerizable mixture in the method ①, the method ② is preferred.

The suspension polymerization is generally conducted at a temperature raised to 40 to 80° C. after deaerating the interior of the reaction tank or purged with an inert gas. After the suspension polymerization, the aqueous phase is removed by, for example, filtration, centrifugation or precipitation. The resultant foamable microspheres are dried as such a comparatively low temperature that the foaming agent is gasified, as needed.

Production Process of Foamable Microspheres (II)

The feature of the second production process according to the present invention resides in that in a process for producing foamable microspheres with a foaming agent enclosed in the shell of a polymer formed by subjecting a polymerizable mixture containing at least the foaming agent and a polymerizable monomer to suspension polymerization in an aqueous dispersion medium, the suspension polymerization of the polymerizable mixture is conducted in the presence of a specified compound. More specifically, the suspension polymerization of the polymerizable mixture is conducted in the presence of at least one compound selected from the group consisting of alkali metal nitrites, stanous chloride, stannic chloride, water-soluble ascorbic acids and boric acid.

The action mechanism of these compounds is not always clearly known at the present stage. However, the presence of these compounds in the suspension polymerization reaction system permits exhibiting such action and effects that ① aggregation of polymer particles formed can be prevented upon the polymerization, ② the adhesion of polymer scale to the wall of a polymerization vessel can be prevented, and ③ a proportion of deformed particles formed can be reduced to provide foamable microspheres even in particle shape in the form of a sphere. Since the prevention of the aggregation of the polymer particles permits preventing the viscosity of the slurry from increasing upon the polymerization, and the prevention of the adhesion of the polymer scale permits effectively removing heat generated by the polymerization, the polymerization reaction can be stably performed. As a result, foamable microspheres in the form of a sphere, which can sharply foam, can be provided.

The foamable microspheres obtained by the production process according to the present invention cause uniform foaming. When the foaming state of foamable microspheres is observed through, for example, a microscope equipped with a hot stage while heating them, it is found that the foamable microspheres obtained by the production process according to the present invention foam at a stretch like popcorn to form uniform foams. On the other hand, some of foamable microspheres obtained by suspension polymerization in the absence of the specified compound may initiate foaming at a temperature lower than the foam initiating temperature by at least 10° C. or at least 30° C. in some cases compared with the foamable microspheres obtained by the production process according to the present invention. In addition, the foamable microspheres obtained by suspension polymerization in the absence of the specified compound is observed greatly reducing their weight due to leak of the foaming agent even at a temperature lower than the foam initiating temperature when their weight loss upon heating is determined by a thermobalance (TGA). Such weight loss takes place due to the leak of the foaming agent from the foamable microspheres before initiation of foaming. Therefore, the prescribed expansion ratio may not be achieved, and in extreme cases, no foaming occurs. When the process described in Japanese Patent Application Laid-Open No. 196813/1995 is applied to such foamable microspheres uneven in foaming, partial foaming occurs upon preheating mixture of the foamable microspheres and a plasticizer. Since foamable microspheres expand to a degree of about 60 to 100 times by volume upon foaming, the mixture with the plasticizer loses its flowability even when foaming partially occurs, so that its pumping becomes infeasible.

(1) Polymerization Aid

The suspension polymerization of the polymerizable mixture is conducted in the presence of at least one compound selected from the group consisting of alkali metal nitrites, stanous chloride, stannic chloride, water-soluble ascorbic acids and boric acid according to the production process of the present invention, whereby such inconveniences as described above are solved, and foamable microspheres having excellent various properties can be stably provided.

Among the alkali metal nitrites, sodium nitrite and potassium nitrite are preferred from the viewpoints of easy availability and price. Examples of the ascorbic acids include ascorbic acid, metal salts of ascorbic acid and ascorbic esters. However, those soluble in water are preferably used. The water-soluble ascorbic acids in the present invention means their solubility in water at 23° C. is at least 1 g/100 cm$^3$. Therefore, ascorbic acid and alkali metal salts thereof are preferred. Among these, L-ascorbic acid (vitamin C), sodium ascorbate and potassium ascorbate are particularly preferably used from the viewpoints of easy availability, and action and effects. These compounds are used in a proportion of generally 0.001 to 1 part by weight, preferably 0.01 to 0.1 parts by weight per 100 parts by weight of the polymerizable monomer.

(2) Suspension Polymerization

In the production process according to the present invention, no particular limitation is imposed on the foaming agent, polymerizable monomer, other auxiliaries, etc., and those conventionally known may be used. More specifically, the production processes according to the present invention can be applied to the production of foamable microspheres of all types.

In the production process according to the present invention, the foaming agent, polymerizable monomer, crosslinkable monomer, polymerization initiator, dispersion stabilizer, other auxiliaries, etc., which are used in "Production process of foamable microspheres (I)" as described above, may be suitably used. With respect to the composition of the polymerizable monomer as well, the composition adopted in "Production process of foamable microspheres (I)" as described above is preferably used.

Although the order that the respective components are added to the aqueous dispersion medium is optional, water and the dispersion stabilizer, and optionally the auxiliary stabilizer and polymerization aid are generally added to a polymerization vessel to prepare an aqueous dispersion medium containing the dispersion stabilizer. In the present invention, at least one compound selected from the group consisting of alkali metal nitrites, stanous chloride, stannic chloride, water-soluble ascorbic acids and boric acid is added to the aqueous dispersion medium. The polymerizable monomer and the foaming agent may be separately added to the aqueous dispersion medium to unite them in the aqueous dispersion medium, thereby preparing a polymerizable mixture (oily mixture). However, they are generally added to the aqueous dispersion medium after premixing them. The polymerization initiator may be used by adding it to the polymerizable monomer in advance. However, when premature polymerization must be prevented, for example, a mixture of the polymerizable monomer and the foaming agent is added into the aqueous dispersion medium, and the polymerization initiator is added while stirring the resultant mixture, thereby uniting them in the aqueous dispersion medium. Incidentally, mixing of the polymerizable mixture (oily mixture) with the aqueous dispersion medium may be conducted in another container, and the resultant mixture may be stirred and mixed and then charged into the polymerization vessel.

Since the polymerizable mixture containing the foaming agent, polymerizable monomer, polymerization initiator, etc. forms an oil phase in the aqueous dispersion medium, fine droplets having a desired size can be formed by stirring and mixing it. Upon the stirring and mixing, conditions such ds the kind and the number of revolutions of the stirring machine are preset according to the desired particle diameter of the foamable microspheres. At this time, the conditions are selected taking the size and shape of the polymerization vessel, the presence of a baffle, and the like into consideration. In the second production process of the present invention, no particular limitation is imposed on the stirring machine, and a homogenizer having high shearing force is preferably used. It goes without saying that the first production process of the present invention may also be applied to the second production process to use the continuous high-speed, high-shear type stirring and dispersing machine.

The polymerization is generally conducted at 40 to 80° C. after deaerating the interior of the reaction vessel or purged with an inert gas. After the polymerization, the aqueous phase is removed by, for example, filtration, centrifugation or precipitation. The resultant foamable microspheres are dried as such a comparatively low temperature that the foaming agent is not gasified, as needed.

The particle diameter of the unformed foamable microspheres and their particle diameter after foaming may be varied over a wide range and designed on the basis of the nature required of the final product. The average particle diameter of the foamable microspheres obtained by the present invention is generally 3 to 100 $\mu$m, preferably 5 to 50 $\mu$m in an unformed state. The content of the foaming agent is generally 5 to 30 wt. %, preferably 10 to 25 wt. %. Foamable microspheres exhibiting various foaming behaviors can be produced by selecting the combination of the polymerizable monomers used, controlling a compositional ratio therebetween, and selecting the kind of the foaming agent.

Application Field

The foamable microspheres obtained by the present invention are used in various fields after they are foamed (expanded) or as they are kept unformed. The foamable microspheres are used as, for example, fillers for paints for automobiles, wallpaper, foaming agents for foaming ink (for applying relief patterns to T-shirts and the like), shrink-preventing agents, etc. making good use of, for example, their expanding ability. The foamable microspheres are used for the purpose of reducing the weights of plastics, paints, various materials, etc., making them porous and imparting various functionalities (for example, slip property, heat insulating property, cushioning property, sound insulating property, etc.) making good use of their volume increase by expansion. In particular, the foamable microspheres according to the present invention can be preferably used in the fields of paint, wallpaper and ink of which surface properties and smoothness are required.

EXAMPLES

The present invention will hereinafter be described more specifically by the following Examples and Comparative Examples.

<Measuring Methods>

(1) Expansion Ratio

A foamable microsphere sample (0.7 g) is placed in a Geer oven and heated for 2 minutes at a prescribed temperature (foaming temperature) to foam it. The resultant foams are placed in a graduated cylinder to measure their volume. This volume is divided by the volume before the foaming to regard the resultant value as an expansion ratio.

(2) Particle Diameter Distribution

Measured by means of a particle diameter distribution meter SALD-3000J manufactured by Shimadzu Corporation.

(3) $\Delta T$

Showing a temperature difference between the temperature of a polymer slurry in a 1.5-liter polymerization vessel upon polymerization in the polymerization vessel and the temperature of a hot water bath (amount of hot water: 60 liters) in which the polymerization vessel has been immersed.

Production Process Using a Continuous High-speed, High-shear Type Stirring and Dispersing Machine Example 1

A polymerization vessel (1.5 liters) equipped with a stirrer was charged with 16.5 g (41.3 g of a dispersion of silica having a solid content of 40 wt. %) of colloidal silica, 1.65 g of (3.3 g in terms of a 50% solution) of a condensation product (acid number: 78 mg KOH/g) of diethanolamine and adipic acid, 169.8 g of common salt, 0.11 g of sodium nitrite and water in such an amount that the total weight of the contents amounts to 557 g, thereby preparing an aqueous dispersion medium. Hydrochloric acid was added so as to keep the pH of the aqueous dispersion medium at 3.2.

On the other hand, a polymerizable mixture composed of 147.4 g of acrylonitrile, 68.2 g of methacrylonitrile, 4.4 g of methyl methacrylate, 0.66 g of trimethylolpropane trimethacrylate, 26.2 g of n-pentane and 15 g of petroleum ether was prepared (wt. % of monomer components= acrylonitrile/methacrylonitrile/methyl methacrylate=67/31/ 2).

Upon stirring and mixing of the polymerizable mixture with the aqueous dispersion medium, the aqueous dispersion medium and the polymerizable mixture were respectively stored in separate tanks as illustrated in FIG. 1, and they were continuously passed through a continuous high-speed, high-shear type stirring and dispersing machine (the number of revolutions=2,500 rpm) at a fixed ratio from these tanks. The aqueous dispersion medium containing the fine droplets of the polymerizable mixture was then charged into a polymerization vessel (1.5 liters) equipped with a stirrer to conduct a reaction at 60° C. for 20 hours by means of a hot water bath. The resultant reaction product was filtered and washed with water repeatedly, and dried to obtain foamable microspheres having an average particle diameter of 27 $\mu$m and a coefficient of variation of 0.30%.

The expansion ratio of the foamable microspheres at a foaming temperature, 170° C. was 58 times. When the foaming state of the foamable microspheres was observed through a microscope equipped with a hot stage while heating them at a rate of 5° C./min, those foaming at a temperature not higher than 140° C. were scarcely observed. Accordingly, it is judged that foaming sharply occurs.

The polymerizable mixture and aqueous dispersion medium prepared above were stirred and mixed by means of a batch-wise high-speed, high-shear type dispersing machine illustrated in FIG. 3 to form fine droplets of the polymerizable mixture. The aqueous dispersion medium containing the fine droplets of the polymerizable mixture was charged into a polymerization vessel (1.5 liters) equipped with a stirrer to conduct a reaction at 60° C. for 20 hours by means of a hot water bath. The resultant reaction product was filtered and washed with water repeatedly, and dried. As a result, foamable micrbspheres having an average particle diameter of 26 $\mu$m and a coefficient of variation of 1.75% were obtained. The expansion ratio of the foamable microspheres at a foaming temperature, 170° C. was 50 times. When the foaming state of the foamable microspheres was observed through a microscope equipped with a hot stage while heating them at a rate of 10° C./min, those foaming at a temperature not higher than 140° C. were scarcely observed. When the foaming state thereof was observed in more detail by changing the heating rate to 5° C./min, however, some of them were observed foaming at a temperature not higher than 140° C. Accordingly, it is understood that foamable microspheres more sharp in particle diameter distribution are obtained by using the continuous high-speed, high-shear type stirring and dispersing machine.

Example 2

Foamable microspheres were prepared in the same manner as in Example 1 except that upon stirring and mixing of the polymerizable mixture with the aqueous dispersion medium, the polymerizable mixture containing the foaming agent and the polymerizable monomers was primarily dispersed in the aqueous dispersion medium as illustrated in FIG. 2, the resultant primary dispersion was passed through the continuous high-speed, high-shear type stirring and dispersing machine (the number of revolutions=2,500 rpm), and the suspension polymerization was then conducted. The resultant reaction product was filtered and washed with water repeatedly, and dried to obtain foamable microspheres having an average particle diameter of 26 $\mu$m and a coefficient of variation of 0.37%.

The expansion ratio of the foamable microspheres at a foaming temperature, 170° C. was 54 times. When the foaming state of the foamable microspheres was observed through a microscope equipped with a hot stage while heating them at a rate of 5° C./min, those foaming at a temperature not higher than 140° C. were scarcely observed. Accordingly, it is judged that foaming sharply occurs.

Comparative Example 1

A polymerization vessel (1.5 liters) equipped with a stirrer was charged with 770 g of deionized water and 11 g of colloidal silica having a solid content of 40 wt. % to dissolve the silica in the deionized water. Further, hydrochloric acid was added to prepare an aqueous dispersion medium having a pH of 3.5.

On the other hand, a polymerizable mixture composed of 123.2 g of vinylidene chloride, 85.8 g of acrylonitrile, 11 g of methyl methacrylate, 0.33 g of trimethylolpropane trimethacrylate, 1.1 g of 2,2'-azobis-2,4-dimethylvaleronitrile and 35.2 g of butane was prepared (wt. % of monomer components=vinylidene chloride/ acrylonitrile/methyl methacrylate=59/39/5). This polymerizable mixture and the aqueous dispersion medium prepared above were then stirred and mixed by means of a batch-wise high-speed, high-shear type dispersing machine illustrated in FIG. 3 to form fine droplets of the polymerizable mixture. The aqueous dispersion medium containing the fine droplets was then charged into a polymerization vessel to conduct a reaction at 50° C. for 22 hours. The resultant reaction product was filtered and washed with water repeatedly, and dried to obtain foamable microspheres having an average particle diameter of 13 $\mu$m and a coefficient of variation of 3.64%.

Example 3

Foamable microspheres were prepared in the same manner as in Comparative Example 1 except that no batch-wise high-speed, high-shear type dispersing machine was used upon stirring and mixing of the polymerizable mixture with the aqueous dispersion medium, the aqueous dispersion medium and the polymerizable mixture were respectively stored in separate tanks as illustrated in FIG. 1, they were continuously passed through a continuous high-speed, high-shear type stirring and dispersing machine (the number of revolutions=2,500 rpm) at a fixed ratio, and the suspension polymerization was then conducted.

The resultant reaction product was filtered and washed with water repeatedly, and dried to obtain foamable microspheres having an average particle diameter of 14 $\mu$m and a coefficient of variation of 0.43%.

Comparative Example 2

A polymerization vessel (1.5 liters) equipped with a stirrer was charged with 770 g of deionized water and 11 g of colloidal silica having a solid content of 40 wt. % to dissolve the silica in the deionized water. Further, hydrochloric acid was added to prepare an aqueous dispersion medium having a pH of 3.5.

On the other hand, a polymerizable mixture composed of 123.2 g of acrylonitrile, 85.8 g of methyl methacrylate, 11 g of methyl acrylate, 0.33 g of trimethylolpropane trimethacrylate, 1.1 g of 2,2'-azobis-2,4-dimethylvaleronitrile and 35.2 g of isopentane was prepared (wt. % of monomer components=acrylonitrile/methyl methacrylate/methyl acrylate=56/39/5).

This polymerizable mixture and the aqueous dispersion medium prepared above were then stirred and mixed by means of a batch-wise high-speed, high-shear type dispersing machine to form fine droplets of the polymerizable mixture. The aqueous dispersion medium containing the fine droplets was then charged into a polymerization vessel to conduct a reaction at 50° C. for 22 hours. The resultant reaction product was filtered and washed with water repeatedly, and dried to obtain foamable microspheres having an average particle diameter of 12 µm and a coefficient of variation of 3.17%.

Example 4

Foamable microspheres were prepared in the same manner as in Comparative Example 2 except that no batch-wise high-speed, high-shear type dispersing machine was used upon stirring and mixing of the polymerizable mixture with the aqueous dispersion medium, the aqueous dispersion medium and the polymerizable mixture were respectively stored in separate tanks as illustrated in FIG. 1, they were continuously passed through a continuous high-speed, high-shear type stirring and dispersing machine (the number of revolutions=2,500 rpm) at a fixed ratio, and the suspension polymerization was then conducted.

The resultant reaction product was filtered and washed with water repeatedly, and dried to obtain foamable microspheres having an average particle diameter of 16 µm and a coefficient of variation of 1.00%.

Production Process Using a Polymerization Aid

Comparative Example 3

A polymerization vessel (1.5 liters) equipped with a stirrer was charged with 16.5 g (41.3 g of a dispersion of silica having a solid content of 40 wt. %) of colloidal silica, 1.65 g of (3.3 g in terms of a 50% solution) of a condensation product (acid number: 78 mg KOH/g) of diethanolamine and adipic acid, 169.8 g of common salt and water in such an amount that the total weight of the contents amounts to 557 g, thereby preparing an aqueous dispersion medium. Hydrochloric acid was added so as to keep the pH of the aqueous dispersion medium at 3.2.

On the other hand, an oily mixture composed of 147.4 g of acrylonitrile, 68.2 g of methacrylonitrile, 4.4 g of methyl methacrylate, 0.66 g of trimethylolpropane trimethacrylate, 26.2 g of n-pentane and 15 g of petroleum ether was prepared (ratio by parts by weight: acrylonitrile/methacrylonitrile/methyl methacrylate=67/31/2). This oily mixture and the aqueous dispersion medium prepared above were stirred and mixed in a homogenizer to form fine droplets of the oily mixture.

The aqueous dispersion medium containing the fine droplets of the oily mixture was charged into a polymerization vessel (1.5 liters) equipped with a stirrer to conduct a reaction at 60° C. for 20 hours by means of a hot water bath.

As a result, it was difficult to remove heat generated by the reaction, and ΔT reached 2.7° C. The viscosity of the polymer slurry rapidly increased during the polymerization reaction, so that the flowability of the slurry was very deteriorated. The sifting ability of the slurry obtained after the polymerization was also poor. Many aggregates were observed in the slurry, and the polymer adhered as scale to the wall of the polymerization vessel. The resultant reaction product was filtered and washed with water repeatedly, and dried to obtain foamable microspheres having an average particle diameter of 30 µm and a bulk density of 0.36 g/cm$^3$. The expansion ratio of the foamable microspheres at a foaming temperature, 170° C. was 45 times.

When the foaming state of the foamable microspheres was observed through a microscope equipped with a hot stage while heating them at a rate of 10° C./min, those foaming at a temperature not higher than 130° C. were observed in large numbers.

The viscosity of a 33.3 wt. % solution of the unformed foamable microspheres in diisononyl phthalate (hereinafter abbreviated as "DINP") was as high as 1,600 centipoises. Incidentally, the reaction was scaled up to a 10-liter polymerization vessel in accordance with the formulation described above. As a result, it was impossible to control the reaction temperature.

Example 5

Foamable microspheres were prepared in the same manner as in Comparative Example 3 except that 0.11 g of sodium nitrite were further added upon the preparation of the aqueous dispersion medium. ΔT was as very small as 0.2° C., and heat generated by the polymerization was able to be fully removed even when the reaction was scaled up to a 10-liter polymerization vessel. The viscosity of the slurry upon the polymerization in the 1.5-liter polymerization vessel was low, the flowability of the slurry was very good, and the sifting ability of the slurry thus obtained was also good. Occurrence of aggregates and adhesion of polymer scale to the wall of the polymerization vessel were scarcely observed. The resultant reaction product was filtered and washed with water repeatedly, and dried to obtain foamable microspheres having an average particle diameter of 28 µm and a bulk density of 0.43 g/cm$^3$. The expansion ratio of the foamable microspheres at a foaming temperature, 170° C. was 55 times. When the foaming state of the foamable microspheres was observed through a microscope equipped with a hot stage while heating them at a rate of 10° C./min, those foaming at a temperature not higher than 140° C. were scarcely observed. Accordingly, it is judged that foaming sharply occurs. The viscosity of a 33.3 wt. % solution of the unformed foamable microspheres in DINP was as low as 720 centipoises, and so the flowability of the solution was good.

Comparative Example 4

A polymerization vessel (1.5 liters) equipped with a stirrer was charged with 792 g of deionized water, and 39.6 g of magnesium chloride hexahydrate were added under stirring to dissolve it in the deionized water. To this solution, were added 0.044 g of Pelex OT-P (product of Kao Corporation, sodium dialkyl sulfosuccinate) and 23.8 g of sodium hydroxide having a solid content of 25 wt. %, thereby preparing a colloidal dispersion of magnesium hydroxide. The pH of the aqueous dispersion (aqueous dispersion medium) was 9.8.

On the other hand, an oily mixture composed of 182.6 g of acrylonitrile, 26.4 g of methyl methacrylate, 11 g of methyl acrylate, 0.44 g of trimethylolpropane trimethacrylate, 1.1 g of 2,2'-azobis-2,4-dimethylvaleronitrile and 39.6 g of pentane was prepared (ratio by parts by weight: acrylonitrile/methyl methacrylate/methyl acrylate=83/12/5). This oily mixture and the aqueous dispersion medium prepared above were then stirred and mixed by means of a homogenizer to form fine droplets of the oily mixture. The aqueous dispersion medium containing the fine droplets was then charged into the polymerization vessel to conduct a reaction at 57° C. for 20 hours.

ΔT was as great as 6° C., and it was impossible to control the polymerization temperature due to insufficient removal of heat generated by the polymerization when the reaction was scaled up to a 10-liter polymerization vessel. The viscosity of the slurry upon the polymerization in the 1.5-liter polymerization vessel rapidly increased, so that the flowability of the slurry was very deteriorated. The sifting ability of the slurry thus obtained was also poor. Many aggregates were observed in the slurry, and polymer scale adhered to the wall of the polymerization vessel and the agitating blade.

The resultant reaction product was filtered and washed with water repeatedly, and dried to obtain foamable microspheres having an average particle diameter of 30 μm and a bulk density of 0.35 g/cm³. The expansion ratio of the foamable microspheres at a foaming temperature, 170° C. was 39 times. The viscosity of the 33.3 wt. % solution of the unformed foamable microspheres in DINP was as high as 2,500 centipoises. When the foaming state of the foamable microspheres was observed through a microscope equipped with a hot stage while heating them at a rate of 10° C./min, those foaming at a temperature not higher than 130° C. were observed in large numbers.

Example 6

Foamable microspheres were prepared in the same manner as in Comparative Example 4 except that 0.11 g of boric acid were further added upon the preparation of the aqueous dispersion (aqueous dispersion medium). ΔT became as small as 2° C., and heat generated by the polymerization was able to be fully removed even when the reaction was scaled up to a 10-liter polymerization vessel. The viscosity of the slurry upon the polymerization in the 1.5-liter polymerization vessel was low, the flowability of the slurry was good, and the sifting ability of the slurry thus obtained was also good. Occurrence of aggregates and adhesion of polymer scale to the wall of the polymerization vessel were scarcely observed.

The resultant reaction product was filtered and washed with water repeatedly, and dried to obtain foamable microspheres having an average particle diameter of 28 μm and a bulk density of 0.38 g/cm³. The expansion ratio of the foamable microspheres at a foaming temperature, 170° C. was 49 times. When the foaming state of the foamable microspheres was observed through a microscope equipped with a hot stage while heating them at a rate of 10° C./min, those foaming at a temperature not higher than 140° C. were scarcely observed. Accordingly, it is judged that foaming sharply occurs. The viscosity of a 33.3 wt. % solution of the unformed foamable microspheres in DINP was as low as 1,300 centipoises, and so marked improvement in flowability was recognized.

Comparative Example 5

A polymerization vessel (1.5 liters) equipped with a stirrer was charged with 770 g of deionized water and 11 g of colloidal silica having a solid content of 40 wt. % to dissolve the silica in the deionized water. Further, hydrochloric acid was added to prepare an aqueous dispersion medium having a pH of 3.5.

On the other hand, an oily mixture composed of 123.2 g of vinylidene chloride, 85.8 g of acrylonitrile, 11 g of methyl methacrylate, 0.33 g of trimethylolpropane trimethacrylate, 1.1 g of 2,2'-azobis-2,4-dimethylvaleronitrile and 35.2 g of butane was prepared (ratio by parts by weight: vinylidene chloride/acrylonitrile/methyl methacrylate=56/39/5). This oily mixture and the aqueous dispersion medium prepared above were stirred and mixed in a homogenizer to form fine droplets of the oily mixture. The aqueous dispersion medium containing the fine droplets was then charged into the polymerization vessel to conduct a reaction at 50° C. for 22 hours.

ΔT was as great as 7° C., and it was impossible to control the polymerization temperature due to insufficient removal of heat generated by the polymerization when the reaction was scaled up to a 10-liter polymerization vessel. The viscosity of the slurry upon the polymerization in the 1.5-liter polymerization vessel rapidly increased, so that the flowability of the slurry was very deteriorated. The sifting ability of the slurry thus obtained was also poor. Many aggregates were observed in the slurry, and polymer scale adhered to the wall of the polymerization vessel and the agitating blade. The resultant reaction product was filtered and washed with water repeatedly, and dried to obtain foamable microspheres having an average particle diameter of 14 μm. The foamable microspheres were sifted by a 200-mesh sieve (sieve opening: 75 μm). As a result, the amount of the foamable microspheres remaining on the mesh was 5 wt. %. The expansion ratio of the foamable microspheres at a foaming temperature, 120° C. was 40 times.

Example 7

Foamable microspheres were prepared in the same manner as in Comparative Example 5 except that 0.088 g of stannic chloride were further added upon the preparation of the aqueous dispersion medium. ΔT became as small as 1.5° C., and heat generated by the polymerization was able to be fully removed even when the reaction was scaled up to a 10-liter polymerization vessel. The viscosity of the slurry upon the polymerization in the 1.5-liter polymerization vessel was low, the flowability of the slurry was good, and the sifting ability of the slurry thus obtained was also good. Occurrence of aggregates and adhesion of polymer scale to the wall of the polymerization vessel were scarcely observed. The resultant reaction product was filtered and washed with water repeatedly, and dried to obtain foamable microspheres having an average particle diameter of 15 μm. The foamable microspheres were sifted by a 200-mesh sieve (sieve opening: 75 μm). As a result, the amount of the foamable microspheres remaining on the mesh was as very small as 0.1 wt. % or less. The expansion ratio of the foamable microspheres at a foaming temperature, 120° C. was 50 times.

Comparative Example 6

Foamable microspheres were prepared in the same manner as in Comparative Example 1 except that 1.1 g of polyvinyl pyrrolidone having a molecular weight of 10,000 were added in place of the condensation product of diethanolamine and adipic acid upon the preparation of the aqueous dispersion medium. ΔT was as great as 3° C., and it was impossible to control the polymerization temperature due to insufficient removal of heat generated by the polymerization when the reaction was scaled up to a 10-liter polymerization vessel. The viscosity of the slurry upon the polymerization in the 1.5-liter polymerization vessel rapidly increased, so that the flowability of the slurry was very deteriorated. The sifting ability of the slurry thus obtained was also poor. Many aggregates were observed in the slurry, and polymer scale adhered to the wall of the polymerization vessel and the agitating blade.

The resultant reaction product was filtered and washed with water repeatedly, and dried to obtain foamable microspheres having an average particle diameter of 32 μm and a bulk density of 0.36 g/cm³. The expansion ratio of the foamable microspheres at a foaming temperature, 170° C. was 42 times. The viscosity of a 33.3 wt. % solution of the unformed foamable microspheres in DINP was as high as 2,700 centipoises. When the foaming state of the foamable microspheres was observed through a microscope equipped with a hot stage while heating them at a rate of 10° C./min, those foaming at a temperature not higher than 130° C. were observed in large numbers.

Example 8

Foamable microspheres were prepared in the same manner as in Comparative Example 6 except that 0.13 g of sodium nitrite were further added upon the preparation of the aqueous dispersion medium. ΔT became as very small as 0.3° C., and heat generated by the polymerization was able to be fully removed even when the reaction was scaled up to a 10-liter polymerization vessel. The viscosity of the slurry upon the polymerization in the 1.5-liter polymerization vessel was low, the flowability of the slurry was good, and the sifting ability of the slurry thus obtained was also good. Occurrence of aggregates and adhesion of polymer scale to the wall of the polymerization vessel were scarcely observed.

The resultant reaction product was filtered and washed with water repeatedly, and dried to obtain foamable microspheres having an average particle diameter of 31 μm and a bulk density of 0.42 g/cm³. The expansion ratio of the foamable microspheres at a foaming temperature, 170° C. was 57 times. The viscosity of a 33.3 wt. % solution of the unformed foamable microspheres in DINP. was as low as 800 centipoises, and so the flowability of the solution was good. When the foaming state of the foamable microspheres was observed through a microscope equipped with a hot stage while heating them at a rate of 10° C./min, those foaming at a temperature not higher than 140° C. were not very observed. Accordingly, it is judged that foaming sharply occurs.

Example 9

Foamable microspheres were prepared in the same manner as in Example 8 except that 0.3 g of L-ascorbic acid (vitamin C) were added in place of sodium nitrite upon the preparation of the aqueous dispersion medium.

ΔT became as very small as 0.3° C., and heat generated by the polymerization was able to be fully removed even when the reaction was scaled up to a 10-liter polymerization vessel. The viscosity of the slurry upon the polymerization in the 1.5-liter polymerization vessel was low, the flowability of the slurry was good, and the sifting ability of the slurry thus obtained was also good. Occurrence of aggregates and adhesion of polymer scale to the wall of the polymerization vessel were scarcely observed.

The resultant reaction product was filtered and washed with water repeatedly, and dried to obtain foamable microspheres having an average particle diameter of 32 μm and a bulk density of 0.43 g/cm³. The expansion ratio of the foamable microspheres at a foaming temperature, 170° C. was 62 times. The viscosity of a 33.3 wt. % solution of the unformed foamable microspheres in DINP was as low as 750 centipoises, and so the flowability of the solution was good. When the foaming state of the foamable microspheres was observed through a microscope equipped with a hot stage while heating them at a rate of 10° C./min, those foaming at a temperature not higher than 140° C. were not very observed. Accordingly, it is judged that foaming sharply occurs.

Industrial Applicability

According to the present invention, there can be provided foamable microspheres which have a spherical particle shape, are extremely sharp in particle diameter distribution and low in viscosity when prepared into a slurry, and are capable of sharply foaming to provide uniform foams. The foamable microspheres obtained by the production process according to the present invention have an extremely sharp particle diameter distribution of at most 1.50% in terms of the coefficient of variation of the particle diameter distribution and hence can sharply foam to form uniform foams due to their low contents of coarse particles and minute particles.

According to the production processes of the present invention, aggregation of polymer particles formed is prevented upon the polymerization, and the polymer formed does also not adhere to the wall of a polymerization vessel, so that heat generated by the polymerization can be efficiently removed, and moreover high-quality foamable microspheres can be stably produced. The foamable microspheres obtained by the production processes of the present invention are even in particle shape in the form of a sphere and can sharply foam due to their low contents of aspherical particles and aggregated particles to form uniform foams.

What is claimed is:

1. Foamable microspheres with a foaming agent enclosed in the shell of a polymer, wherein the average particle diameter of the microspheres is within a range of 3 to 100 μm, and the coefficient of variation of the particle diameter distribution thereof is at most 1.50%.

2. The foamable microspheres according to claim 1, wherein the shell of the polymer is formed from a vinylidene chloride copolymer or a (meth)acrylonitrile copolymer.

3. The foamable microspheres according to claim 1, which are obtained by subjecting a polymerizable mixture containing at least the foaming agent and a polymerizable monomer to suspension polymerization in an aqueous dispersion medium.

4. A process for producing foamable microspheres with a foaming agent enclosed in the shell of a polymer formed by subjecting a polymerizable mixture containing at least the foaming agent and a polymerizable monomer to suspension polymerization in an aqueous dispersion medium, the process comprising feeding the aqueous dispersion medium and the polymerizable mixture into a continuous high-speed, high-shear type stirring and dispersing machine, continuously stirring both in the stirring and dispersing machine so as to disperse the polymerizable mixture in the aqueous dispersion medium, and then pouring the resultant dispersion into a polymerization tank to conduct suspension polymerization in the polymerization tank to produce foamable microspheres having a coefficient of variation of the particle diameter distribution of at most 1.50%.

5. The production process according to claim 4, wherein in the step of feeding the aqueous dispersion medium and the polymerizable mixture into the continuous high-speed, high-shear type stirring and dispersing machine, the aqueous dispersion medium and the polymerizable mixture are continuously fed as separate streams at a fixed ratio into the continuous high-speed, high-shear type stirring and dispersing machine.

6. The production process according to claim 4, wherein in the step of feeding the aqueous dispersion medium and the polymerizable mixture into the continuous high-speed, high-shear type stirring and dispersing machine, the aqueous dispersion medium and the polymerizable mixture are poured into a dispersing tank, both are stirred in the dispersing tank to primarily disperse the polymerizable mixture in the aqueous dispersion medium, and the resultant primary dispersion is then fed into the continuous high-speed, high-shear type stirring and dispersing machine.

7. The production process according to claim 4, wherein in the step of continuously stirring the aqueous dispersion medium and the polymerizable mixture in the continuous high-speed, high-shear type stirring and dispersing machine so as to disperse the polymerizable mixture in the aqueous dispersion medium, the continuous high-speed, high-shear type stirring and dispersing machine is rotated at the number of revolutions within a range of 1,400 to 14,000 rpm.

8. The production process according to claim 4, wherein the aqueous dispersion medium contains water, a dispersion stabilizer and at least one compound selected from the group consisting of alkali metal nitrites, stannous chloride, stannic chloride, water-soluble ascorbic acids and boric acid as a polymerization aid.

9. The production process according to claim 4, wherein foamable microspheres having an average particle diameter within a range of 3 to 100 $\mu$m and a coefficient of variation of the particle diameter distribution of at most 1.50% are obtained by the suspension polymerization.

10. The production process according to claim 4, wherein the polymerizable monomer is a monomer mixture containing (a) 30 to 95 wt. % of vinylidene chloride and (b) 5 to 70 wt. % of at least one monomer selected from the group consisting of acrylonitrile, methacrylonitrile, acrylates, methacrylates, styrene and vinyl acetate.

11. The production process according to claim 10, wherein the monomer mixture contains (a) 40 to 80 wt. % of vinylidene chloride, (b1) 19 to 50 wt. % of at least one monomer selected from the group consisting of acrylonitrile and methacrylonitrile, and (b2) 1 to 20 wt. % of at least one monomer selected from the group consisting of acrylates and methacrylates.

12. The production process according to claim 4, wherein the polymerizable monomer is a monomer mixture containing (c) 51 to 95 wt. % of at least one monomer selected from the group consisting of acrylonitrile and methacrylonitrile and (d) 5 to 49 wt. % of at least one monomer selected from the group consisting of vinylidene chloride, acrylates, methacrylates, styrene and vinyl acetate.

13. The production process according to claim 12, wherein the monomer mixture contains (c) 51 to 95 wt. % of at least one monomer selected from the group consisting of acrylonitrile and methacrylonitrile, (d1) 1 to 40 wt. % of vinylidene chloride, and (d2) 1 to 48 wt. % of at least one monomer selected from the group consisting of acrylates and methacrylates.

14. The production process according to claim 4, wherein the polymerizable monomer is a monomer mixture containing (e) 70 to 95 wt. % of at least one monomer selected from the group consisting of acrylonitrile and methacrylonitrile, and (f) 5 to 30 wt. % of at least one monomer selected from the group consisting of acrylates and methacrylates.

15. The production process according to claim 14, wherein the monomer mixture contains (e1) 55 to 75 wt. % of acrylonitrile, (e2) 20 to 40 wt. % of methacrylonitrile, and (f) 1 to 10 wt. % of at least one monomer selected from particles formed upon the polymerization while preventing the polymer formed from adhering to the wall of a polymerization vessel and efficiently removing heat generated by the polymerization. The foamable microspheres obtained according to this production process can sharply foam to provide uniform foams due to their low contents of aspherical particles and aggregated particles.

16. A process for producing foamable microspheres with a foaming agent enclosed in the shell of a polymer formed by subjecting a polymerizable mixture containing at least the foaming agent and a polymerizable monomer to suspension polymerization in an aqueous dispersion medium, the process comprising conducting the suspension polymerization of the polymerizable mixture in the presence of at least one compound selected from the group consisting of alkali metal nitrites, stannous chloride, stannic chloride, water-soluble ascorbic acids and boric acid.

17. The production process according to claim 16, wherein the alkali metal nitrite is sodium nitrite or potassium nitrite.

18. The production process according to claim 16, wherein the water-soluble ascorbic acid is ascorbic acid, sodium ascorbate or potassium ascorbate.

19. The production process according to claim 16, wherein the compound is contained in the aqueous dispersion medium in a proportion of 0.001 to 1 part by weight per 100 parts by weight of the polymerizable monomer.

20. The production process according to claim 16, wherein the polymerizable monomer is a monomer mixture containing (a) 30 to 95 wt. % of vinylidene chloride and (b) 5 to 70 wt. % of at least one monomer selected from the group consisting of acrylonitrile, methacrylonitrile, acrylates, methacrylates, styrene and vinyl acetate.

21. The production process according to claim 20, wherein the monomer mixture contains (a) 40 to 80 wt. % of vinylidene chloride, (b1) 19 to 50 wt. % of at least one monomer selected from the group consisting of acrylonitrile and methacrylonitrile, and (b2) 1 to 20 wt. % of at least one monomer selected from the group consisting of acrylates and methacrylates.

22. The production process according to claim 16, wherein the polymerizable monomer is a monomer mixture containing (c) 51 to 95 wt. % of at least one monomer selected from the group consisting of acrylonitrile and methacrylonitrile and (d) 5 to 49 wt. % of at least one monomer selected from the group consisting of vinylidene chloride, acrylates, methacrylates, styrene and vinyl acetate.

23. The production process according to claim 22, wherein the monomer mixture contains (c) 51 to 95 wt. % of at least one monomer selected from the group consisting of acrylonitrile and methacrylonitrile, (d1) to 40 wt. % of vinylidene chloride, and (d2) 1 to 48 wt. % of at least one monomer selected from the group consisting of acrylates and methacrylates.

24. The production process according to claim 16, wherein the polymerizable monomer is a monomer mixture containing (e) 70 to 95 wt. % of at least one monomer selected from the group consisting of acrylonitrile and methacrylonitrile, and (f) 5 to 30 wt. % of at least one monomer selected from the group consisting of acrylates and methacrylates.

25. The production process according to claim 24, wherein the monomer mixture contains (e1) 55 to 75 wt. % of acrylonitrile, (e2) 20 to 40 wt. % of methacrylonitrile, and (f) 1 to 10 wt. % of at least one monomer selected from the group consisting of acrylates and methacrylates.

\* \* \* \* \*

UNITED STATES PATENT AND TRADEMARK OFFICE
CERTIFICATE OF CORRECTION

PATENT NO.    : 6,613,810 B1
DATED         : September 2, 2003
INVENTOR(S)   : Tetsuo Ejiri et al.

It is certified that error appears in the above-identified patent and that said Letters Patent is hereby corrected as shown below:

Title page, Item [54] and Column 1, lines 1 and 2,
Delete the title and insert the following therefor: -- FOAMABLE MICROSPHERE AND PRODUCTION PROCESS THEREOF --.

Title page,
Item [73], please change the assignee to read as follows:
-- Kureha Kagaku K.K., (Tokyo, JP) --.

Column 17,
Line 12, after "trimethacrylate," insert -- 1.1 g of 2,2'-azobis-2,4-dimethylvaleronitrile, --.

Column 18,
Line 35, change "59/39/5" to -- 56/39/5 --.

Column 19,
Line 58, before "26.2", insert -- 1.1 g of 2,2'-azobis-2,4-dimethylvaleronitrile, --.

Column 22,
Line 63, change "Comparative Example 1" to -- Comparative Example 3 --.

UNITED STATES PATENT AND TRADEMARK OFFICE
CERTIFICATE OF CORRECTION

PATENT NO. : 6,613,810 B1
DATED : September 2, 2003
INVENTOR(S) : Tetsuo Ejiri et al.

It is certified that error appears in the above-identified patent and that said Letters Patent is hereby corrected as shown below:

<u>Column 26,</u>
Line 1, change "Claim 14" to -- Claim 4 --.
Lines 5-10, change "particles formed upon the polymerization while preventing the polymer formed from adhering to the wall of a polymerization vessel and efficiently removing heat generated by the polymerization. The foamable microspheres obtained according to this production process can sharply foam to provide uniform foams due to their low contents of aspherical and aggregated particles." to -- the group consisting of acrylates and methacrylates. --
Line 62, change "Claim 24" to -- Claim 16 --.

Signed and Sealed this

Seventeenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,613,810 B1
DATED : September 2, 2003
INVENTOR(S) : Tetsuo Ejiri et al.

It is certified that error appears in the above-identified patent and that said Letters Patent is hereby corrected as shown below:

<u>Title page,</u>
Item [73], please change the assignee to read as follows: -- Kureha Kagaku Kogyo K.K., (Tokyo, JP) --.

Signed and Sealed this

Seventh Day of December, 2004

JON W. DUDAS
*Director of the United States Patent and Trademark Office*